United States Patent
Lindoff et al.

(10) Patent No.: US 7,822,155 B2
(45) Date of Patent: Oct. 26, 2010

(54) INTERFERENCE ESTIMATION IN CDMA SYSTEMS USING ALTERNATIVE SCRAMBLING CODES

(75) Inventors: Bengt Lindoff, Bjärred (SE); Johan Nilsson, Höllviken (SE); Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2121 days.

(21) Appl. No.: 10/700,855

(22) Filed: Nov. 4, 2003

(65) Prior Publication Data

US 2005/0094816 A1    May 5, 2005

(51) Int. Cl.
*H03D 1/04* (2006.01)
(52) U.S. Cl. .......... 375/346; 375/316; 375/285; 375/130; 375/137; 375/138; 375/144; 375/148
(58) Field of Classification Search .......... 375/130, 375/137, 138, 144, 148, 346, 316, 285; 455/436, 455/522; 370/320, 335, 342, 441; 380/268
See application file for complete search history.

(56) References Cited

U.S. PATENT DOCUMENTS

| | | | |
|---|---|---|---|
| 5,305,349 A | | 4/1994 | Dent |
| 5,666,655 A * | | 9/1997 | Ishikawa et al. .......... 455/512 |
| 5,852,630 A * | | 12/1998 | Langberg et al. .......... 375/219 |
| 6,038,238 A * | | 3/2000 | Jokinen et al. .......... 375/130 |
| 6,363,104 B1 | | 3/2002 | Bottomley |
| 6,373,878 B1 | | 4/2002 | Palenius et al. |
| 7,251,497 B2 * | | 7/2007 | Jalloul et al. .......... 455/522 |
| 2001/0028677 A1 | | 10/2001 | Wang et al. |
| 2003/0142730 A1 * | | 7/2003 | Lin .......... 375/147 |
| 2003/0156562 A1 | | 8/2003 | Zeira et al. |
| 2004/0076132 A1 * | | 4/2004 | Tiirola et al. .......... 370/335 |

(Continued)

FOREIGN PATENT DOCUMENTS

EP    1077551 A1    2/2001

(Continued)

OTHER PUBLICATIONS

U.S. Appl. No. 09/344,898, Wang et al., "Multi-stage Rake Combing Methods and Apparatus", filed Jun. 25, 1999.

(Continued)

*Primary Examiner*—Shuwang Liu
*Assistant Examiner*—Helene Tayong
(74) *Attorney, Agent, or Firm*—Potomac Patent Group PLLC

(57) ABSTRACT

Methods and apparatus that improve interference (I) estimation in CDMA systems in which the DPCH is sorted under a scrambling code different from the scrambling code of a channel such as the CPICH are described. In such systems, DPCH I-estimation cannot be done by measuring on the CPICH and transforming to the DPCH due to the different interference situations on the two channels. Instead, the DPCH interference is estimated by using knowledge of empty channelization codes in the alternative or secondary scrambling code that can be used for I estimation, or using symbols (e.g., control symbols on the DPCCH) on the DPCH, or searching for an empty channelization code and using a found empty code for I-estimation. These techniques improve the SIR estimate in comparison to prior techniques and hence also improve the performance of power control, increasing the system's capacity.

36 Claims, 5 Drawing Sheets

U.S. PATENT DOCUMENTS

2006/0154633 A1* 7/2006 Wang .................. 455/226.3

FOREIGN PATENT DOCUMENTS

| EP | 1176730 A1 | 1/2002 |
| EP | 1 313 243 A1 | 5/2003 |
| WO | 02/087106 A1 | 10/2002 |

OTHER PUBLICATIONS

Turin, George L., "Introduction to Spread-Spectrum Antimultipath Techniques and Their Application to Urban Digital Radio", Proceedings of the IEEE vol. 68, No. 3; pp. 328-353, Mar. 1980.

PCT International Written Opinion, dated Jan. 20, 2005, in connection with PCT International Application No. PCT/EP2004/012251.

PCT International Search Report, dated Jan. 20, 2005, in connection with PCT International Application No. PCT/EP2004/012251.

"Universal Mobile Telecommunications System (UMTS); Spreading and modulation (FDD)", 3GPP TS 25.213 version 5.3.0 Release 5, European Telecommunications Standards Institute $3^{rd}$ Generation Partnership Project, 2003, France.

Yoon, Au-Young-Shin et al.. "TI-Adaptive SIR estimation in WCDMA systems", CONF-Vehicular Technology Conference. IEEE $55^{th}$ Vehicular Technology Conference. VTC Spring 2002 (Cat. No. 02CH37367), Vehicular Technology Conference. IEEE $55^{th}$ Vehicular Technology Conference. VTC Spring 2002, Birmingham, AL, USA, May 6-9, 2002.

Wang, Au-Li-Chun et al., "TI-A near real-time signal to interference ratio measurement technique in a frequency-selective multipath fading channel for the SCDMA system", CONF-IEEE $54^{th}$ Vehicular Technology Conference. VTC Fall 2001. Proceedings (Cat. No. 01CH37211), IEEE $54^{th}$ Vehicular Technology Conference. VTC Fall 2001. Proceedings, Atlantic City, NJ, USA, Oct. 7-11, 2001.

* cited by examiner

| User A | 10 | 10 | 10 | 10 | 10 | 10 | 10 | 10 | 10 | 10 | 10 | 10 | 10 | 10 | 10 | 10 |
|---|---|---|---|---|---|---|---|---|---|---|---|---|---|---|---|---|
| User B | 1100 | | 1100 | | 1100 | | 1100 | | 1100 | | 1100 | | 1100 | | 1100 | |
| User C | 11111111 | | | | 11111111 | | | | 11111111 | | | | 11111111 | | | |

INTERFERENCE ESTIMATION IN CDMA SYSTEMS USING ALTERNATIVE SCRAMBLING CODES

BACKGROUND

This invention relates to telecommunication systems and more particularly to methods and apparatus for improving signal-to-interference estimation in radio systems, such as a wideband code division multiple access (WCDMA) system in which dedicated channels may use secondary scrambling codes.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and WCDMA telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for simplicity, but it will be understood that the principles described in this application can be implemented in other digital communication systems.

WCDMA is based on direct-sequence spread-spectrum techniques. Two different codes are used for separating base stations and physical channels in the downlink (base-to-terminal) direction. Scrambling codes are pseudo-noise (pn) sequences that are mainly used for separating the base stations or cells from each other. Channelization codes are orthogonal sequences that are used for separating different physical channels (terminals or users) in each cell or under each scrambling code. Since all users share the same radio resource in CDMA systems, it is important that each physical channel does not use more power than necessary. This is achieved by a fast transmit power control mechanism, in which the terminal estimates the signal-to-interference ratio (SIR) for its dedicated physical channel (DPCH), compares the estimated SIR against a reference value, and informs the base station to adjust the base station's transmitted DPCH power to an appropriate level. WCDMA terminology is used here, but it will be appreciated that other systems have corresponding terminology. Scrambling and channelization codes and transmit power control are well known in the art.

FIG. 1 depicts a communication system such as a WCDMA system that includes a base station (BS) 100 handling connections with four mobile stations (MSs) 1, 2, 3, 4 that each use downlink (i.e., base-to-mobile or forward) and uplink (i.e., mobile-to-base or reverse) channels. In the downlink, BS 100 transmits to each mobile at a respective power level, and the signals transmitted by BS 100 are spread using orthogonal code words. In the uplink, MS 1-MS 4 transmit to BS 100 at respective power levels. Although not shown, BS 100 also communicates with a radio network controller (RNC), which in turn communicates with a public switched telephone network (PSTN).

The signals transmitted in the exemplary WCDMA system depicted in FIG. 1 can be formed as follows. An information data stream to be transmitted is first multiplied with a channelization code and then the result is multiplied with a scrambling code. The multiplications are usually carried out by exclusive-OR operations, and the information data stream and the scrambling code can have the same or different bit rates. Each information data stream or channel is allocated a unique channelization code, and a plurality of coded information signals simultaneously modulate a radio-frequency carrier signal.

From a mathematical point of view, the transmitted signal $t_k$ in the downlink (before D/A conversion and the front-end transmitter) is given by:

$$t_k = \sum_{i=0}^{M} \sqrt{E_c^i}\, s_k c_k^i u^i \quad \text{Eq. 1}$$

where M is the number of physical channels transmitted by the base station, $$\sqrt{E_c^i}$$

is the energy per chip on channel i, $s_k$ is the scrambling code (QPSK), $c_k^i$ is the channelization code for channel i (BPSK), and $u^i$ is the transmitted symbol on channel i. The signal given by Eq. 1 is up-converted to radio frequency, transmitted through the radio channel by the modulated carrier signal, and received and down-converted to a baseband signal in the front-end of a receiver.

At a mobile station or other receiver, the modulated carrier signal is processed to produce an estimate of the original information data stream intended for the receiver. This process is known as demodulation. The composite received baseband spread signal is commonly provided to a rake processor that includes a number of "fingers", or de-spreaders, that are each assigned to respective ones of selected components, such as multipath echoes or images, in the received signal. Each finger combines a received component with the scrambling sequence and the channelization code so as to de-spread the received composite signal. The rake processor typically de-spreads both sent information data and pilot or training symbols that are included in the composite signal. Various aspects of rake receivers are described in G. Turin, "Introduction to Spread-Spectrum Antimultipath Techniques and Their Application to Urban Digital Radio", Proc. IEEE, vol. 68, pp. 328-353 (March 1980); U.S. Pat. No. 5,305,349 to Dent for "Quantized Coherent Rake Receiver"; U.S. Patent Application Publication No. 2001/0028677 by Wang et al. for "Apparatus and Methods for Finger Delay Selection in Rake Receivers"; and U.S. patent applications Ser. No. 09/165,647 filed on Oct. 2, 1998, by G. Bottomley for "Method and Apparatus for Interference Cancellation in a Rake Receiver" and Ser. No. 09/344,898 filed on Jun. 25, 1999, by Wang et al. for "Multi-Stage Rake Combining Methods and Apparatus".

Considering one rake finger, the received signal $r_k$ is given by:

$$r_k = h \sum_{i=0}^{M} \sqrt{E_c^i}\, s_k c_k^i u^i + e_k \quad \text{Eq. 2}$$

where h represents the radio channel and $e_k$ is noise. In order to retrieve the information transmitted on a channel, say channel j, the received signal $r_k$ described by Eq. 2 is de-spread using the fact that $|s_k|^2 = |c_k^j|^2 = 1$. The de-spread received signal d is given by:

$$d = \frac{1}{SF} \sum_{k=1}^{SF} s_k^* c_k^j r_k \qquad \text{Eq. 3}$$

$$= h \sqrt{E_c^j} u^j + \frac{1}{SF} \sum_{k=1}^{SF} s_k^* c_k^j e_k$$

since the channelization codes c are mutually orthogonal, i.e., $$\frac{1}{SF} \sum_{k=1}^{SF} c^j c^i = 0/1 \text{ if } j \neq i / j = i,$$

and where * indicates the complex conjugate and SF is the spreading factor used for channel j. When the channel-specific spreading codes are orthogonal to one another, the received signal can be correlated with a particular channel (user) spreading code such that only the desired signal related to a particular spreading code is enhanced while the other signals for all the other users (channels) that are orthogonal to the wanted signal are not enhanced.

In order to do good power control, the SIR on the DPCH needs to be estimated. The signal power S, i.e., $|h|^2 E_c^j$ in Eq. 3, is usually estimated using the DPCH pilot symbols, i.e., known symbols transmitted on the DPCH. The interference I, however, is typically estimated using pilot symbols transmitted on the Common Pilot Channel (CPICH), i.e., a channel with large signal strength, and then scaling to the DPCH interference. The interference on the CPICH $I_{CPICH}$ is estimated by:

$$\hat{I}_{CPICH} = \frac{1}{N-1} \sum_{k=1}^{N} |d_k^{CPICH} - \hat{h} u_k^{CPICH}|^2$$

where N is the number of symbols used in the estimation, $d_k^x$ is the k-th symbol de-spread with respect to the scrambling and channelization codes for the channel x, and $u_{kk}^x$ is the k-th transmitted symbol on channel x. The estimated interference on the CPICH $\hat{I}_{CPICH}$ is scaled to the estimated DPCH interference $\hat{I}_{DPCH}$ according to:

$$\hat{I}_{DPCH} = \frac{SF_{CPICH}}{SF_{DPCH}} \hat{I}_{CPICH} \qquad \text{Eq. 4}$$

where $\hat{I}$ is the estimated interference power on the channel identified by the subscript and $SF_{CPICH} = 256$ is the spreading factor of the CPICH. The reason for estimating the interference in this way is that an interference estimate based on the CPICH is better, e.g., less noisy, than an I-estimate based on the DPCH pilot symbols. Methods for estimating S and I in a SIR are well known in the art.

According to the WCDMA standard, a BS may use more than one (the primary) scrambling code, i.e., so-called secondary or alternative scrambling codes. For example, when the channelization code tree is full for the primary scrambling code and there is capacity (i.e., transmitter power) left in the BS, the BS can use a secondary scrambling code for DPCHs For another example, when a terminal (e.g., a mobile station) enters compressed mode that entails reducing the spreading factor in the compressed frames, the terminal can use an alternative scrambling code in the compressed frames in order to avoid reallocation of all codes in the code tree due to the terminal's need for a smaller spreading factor. This is described at 3GPP TS 25.213, sections 5.2.1 and 5.2.2.

For example, orthogonal variable spreading factor (OVSF) codes are used in order to maintain link orthogonality while accommodating different user data rates. The OVSF scheme is a kind of code tree, an example of which is depicted in FIG. 2. This example assumes a binary alphabet and mother code of "1", although the reader will understand that the concept can be generalized. Each level in the tree is a set of codes that are mutually orthogonal. For example, the third level is the set of four length-4 codes "1111", "1100", "1010", and "1001", and a CDMA system employing this code tree can thus support four simultaneous orthogonal users using codes of SF=4. Alternatively, the system could support eight simultaneous orthogonal users of SF=8 (the fourth level in the code tree), etc. Since the chip rate in a direct-sequence CDMA system is typically constant, a higher SF generally corresponds to a lower information bit-rate.

It is also desirable to support a plurality of simultaneous orthogonal users having different information bit-rates, i.e., different SF values, and this can be done using a code at a given "branch" in the code tree if and only if no code on the path leading to the root of the tree is also used. This restriction on code selection from the tree preserves orthogonality between the selected codes used in a cell. FIG. 3 depicts three different channelization codes ("10","1100", and "11111111") used to spread three information streams, which may have arisen from three of the mobile stations depicted in FIG. 1. These three different channelization codes provide three different spreading factors, which correspond to three different user information bit rates. Whichever of these three rates is being detected (de-spread) in a receiver, e.g., a receiver at a base station, the other two will always be orthogonal, assuming that they are transmitted synchronously. For instance, when de-spreading the slowest-symbol-rate signal ("11111111"), the eight chips of each symbol are simply accumulated, and the accumulated contribution from the other two signals during the eight chips will be identically zero (in "+1"/"−1" representation, corresponding to BPSK modulation of the "1"/"0" bits).

In cases in which primary and secondary scrambling codes are used, the transmitted signal $t_k$ can be written as:

$$t_k = \sum_{i=0}^{M_p} \sqrt{E_c^i} s_k^p c_k^i u^i + \sum_{j=0}^{M_s} \sqrt{E_c^j} s_k^s c_k^j u^j \qquad \text{Eq. 5}$$

where $s^p$ and $s^s$ are the primary and secondary scrambling codes, respectively, and $M_p$ and $M_s$ are the number of physical channels under the respective scrambling code (typically, $M_s \ll M_p$). The received signal $r_k$ at one finger of the rake receiver can then be modeled as:

$$r_k = h\left(\sum_{i=0}^{M_p} \sqrt{E_c^i}\, s_k^p c_k^i u^i + \sum_{j=0}^{M_s} \sqrt{E_c^j}\, s_k^s c_k^j u^j\right) + e_k \qquad \text{Eq. 6}$$

Assuming a desired DPCH uses a secondary scrambling code (channel code 1), we get the following de-spread received signal d:

$$d = \frac{1}{SF}\sum_{k=1}^{SF} s_k^s * c_k^1 r_k \qquad \text{Eq. 7}$$

$$= h\sqrt{E_c^1}\, u^1 + \frac{1}{SF}\sum_{k=1}^{SF} s_k^s * c_k^1\left(h\sum_{i=0}^{M_p} \sqrt{E_c^i}\, s_k^p c_k^i u^i + e_k\right)$$

As can be seen from Eq. 7, the channels under the primary scrambling code are transformed to white noise in a channel under a secondary scrambling code since the scrambling codes are pn-sequences and not orthogonal codes. Hence, the interference (noise) $n_1$ affecting the desired code 1 is given by:

$$n_1 = \frac{1}{SF}\sum_{k=1}^{SF} s_k^s * c_k^1\left(h\sum_{i=0}^{M_p} \sqrt{E_c^i}\, s_k^p c_k^i u^i + e_k\right) \qquad \text{Eq. 8}$$

and the interference power (noise power) $I_1$ is given by:

$$I_1 = \frac{1}{SF}\left(|h|^2 \sum_{i=0}^{M_p} E_c^i + \sigma_e^2\right) \qquad \text{Eq. 9}$$

where $\sigma_e^2$ is the variance of the noise $e_k$. Using the I-estimate obtained from the CPICH (which is a channel always sorted under the primary scrambling code, channelization code 0), the interference (noise) $n_2$ is given by:

$$n_2 = \frac{1}{SF}\sum_{k=1}^{SF} s_k^p * c_k^0\left(h\sum_{i=0}^{M_s} \sqrt{E_c^i}\, s_k^s c_k^i u^i + e_k\right) \qquad \text{Eq. 10}$$

and the interference power (noise power) $I_2$ is given by:

$$I_2 = |h|^2 \frac{1}{SF}\left(\sum_{i=0}^{M_s} E_c^i + \sigma_e^2\right) \qquad \text{Eq. 11}$$

It is easily seen that Eqs. 8 and 9 are not equivalent to Eqs. 10 and 11. Furthermore, computer simulations indicate that the loss in a power-controlled environment using an I-estimate obtained from a CPICH using one scrambling code while the DPCH uses another scrambling code can be several dB in terms of average needed BS power on the DPCH. Hence, in cases when alternative scrambling codes are used, there is a need for a better way to estimate the interference than the conventional CPICH I-estimate approach.

One simple known solution to this problem is to use the DPCH pilot symbols for both signal power (S) estimation and interference power (I) estimation, but this solution has problems. For example, the I-estimate is noisy because the number of DPCH pilot symbols is small and the DPCH's overall signal power is small since the DPCH is power-controlled. The noisy I-estimate produces a noisy SIR estimate, and since the SIR estimate directly affects the average needed BS DPCH power, erroneously determining the average power due to the noisy SIR estimate can reduce the system capacity.

Hence, there is a need for methods and apparatus capable of better estimating interference power in cases such as those in which alternative scrambling codes are used in WCDMA such that the performance, in terms of accuracy in the SIR estimate, becomes similar to the case in which the DPCH is sorted under the primary scrambling code, i.e., the scrambling code under which the CPICH is sorted.

SUMMARY

This application presents methods and apparatus that improve interference estimation in CDMA systems in which the DPCH is sorted under a scrambling code different from the scrambling code of a channel such as the CPICH. In such systems, DPCH I-estimation cannot be done by measuring on the CPICH and transforming to the DPCH due to the different interference situations on the two channels. Instead, the DPCH interference is estimated by using knowledge of empty channelization codes in the alternative or secondary scrambling code that can be used for I estimation, or using symbols (e.g., control symbols on the DPCCH) on the DPCH, or searching for an empty channelization code and using a found empty code for I-estimation. These techniques improve the SIR estimate in comparison to prior techniques and hence also improve the performance of power control, thereby increasing the system's capacity.

In one aspect of the invention, a method of estimating interference includes the steps of determining an empty channelization code under the alternative scrambling code; if an empty channelization code is determined, using the empty channelization code for estimating the interference; and otherwise, estimating the interference by determining a variance of symbols in at least one portion of a dedicated channel.

In another aspect of the invention, a method of searching for an empty channelization code includes the steps of generating an initial I-estimate; setting a threshold based on the initial I-estimate; selecting a candidate empty code; for the candidate empty code, forming an I-estimate; comparing the formed I-estimate to the threshold; and if the formed I-estimate exceeds the threshold, selecting another candidate empty code and repeating the forming and comparing steps, otherwise identifying the candidate empty code as an empty channelization code.

In another aspect of the invention, an apparatus for estimating interference in a terminal in a code division multiple access communication system, in which a pilot channel uses a scrambling code and the terminal uses an alternative scrambling code on a dedicated channel determined by a channelization code, includes a controller and an interference estimator. The controller determines an empty channelization code m under the alternative scrambling code, and if the controller determines an empty channelization code m, the interference estimator generates an estimate of the interference based on the empty channelization code m. Otherwise, the interference estimator generates the estimate of the interference based on a variance of symbols in at least one portion of the dedicated channel.

In yet another aspect of the invention, a computer-readable medium contains a computer program for estimating interference in a terminal in a code division multiple access communication system, in which a pilot channel uses a scrambling code and the terminal uses an alternative scrambling code on a dedicated channel determined by a channelization code. The computer program performs the steps of determining an empty channelization code m under the alternative scrambling code; if an empty channelization code m is determined, using the empty channelization code m for estimating the interference; and otherwise, estimating the interference by determining a variance of symbols in at least one portion of the dedicated channel.

BRIEF DESCRIPTION OF THE DRAWINGS

The objects and advantages of this invention will be apparent from reading this description in conjunction with the drawings, in which.

DETAILED DESCRIPTION

Figure 1:
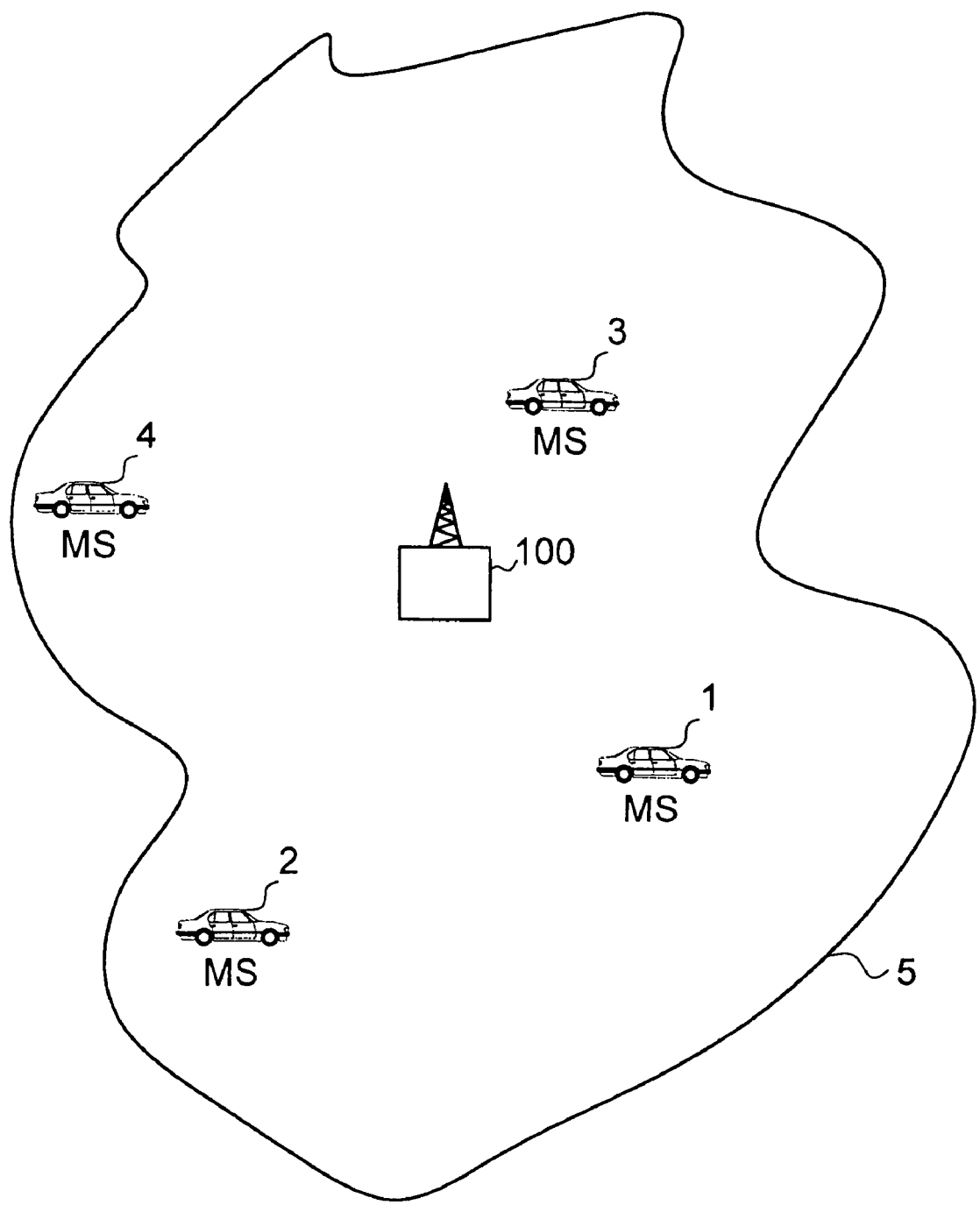
FIG. 1 depicts a communication system.

One method of estimating the interference power I uses an empty channelization code, i.e., a code that is not currently used or is reserved for this purpose, as described for example in U.S. patent application Ser. No. 09/525,898 filed on Mar. 15, 2000, by T. Palenius for "Code Reservation for Interference Measurement in a CDMA Radiocommunication System", which is expressly incorporated here by reference. Assuming that a code m is empty, the interference power on the code m is given by:

$$I_m = \frac{1}{N}\sum_{k=1}^{N}|d_k^m|^2 \qquad \text{Eq. 12}$$

where N is the number of symbols used in the estimation and $d_k^m$ means the k-th symbol de-spread with respect to the scrambling and channelization codes. It may be noted that $I_1$ in Eq. 9 shows the variance of the estimate $I_m$. Looking again at Eq. 7 and assuming code m is empty, the de-spread received signal d is given by:

$$d = \frac{1}{SF}\sum_{k=1}^{SF} s_k^s * c_k^m r_k \qquad \text{Eq. 13}$$

$$= 0 + \frac{1}{SF}\sum_{k=1}^{SF} s_k^s * c_k^m \left( h\sum_{i=0}^{M_p}\sqrt{E_c^i}\, s_k^P c_k^i u^i + e_k \right)$$

The interference power (noise power) $I_1$ in Eq. 13 is given by:

$$I_1 = \frac{1}{SF}\left(|h|^2 \sum_{i=0}^{M_p} E_c^i + \sigma_e^2\right) \qquad \text{Eq. 14}$$

which can be seen is equal to the noise power given by Eq. 9. All that is needed is for the receiver to identify or be informed of an empty channelization code as explained in more detail below.

Another method of estimating the interference power I involves determining the variance of the de-spread received signal on the DPCH. Assuming the de-spread received signal d is given by Eq. 7, it can be observed that the complex amplitude $a_d(k)$ of the k-th sample of the de-spread received signal $d_k$ is given by:

$$a_d(k) = |Re(d_k)| + j|Im(d_k)| \qquad \text{Eq. 15}$$

and that the mean $m_d$ of a number N of these complex amplitudes is given by:

$$m_d = \frac{1}{N}\sum_{k=1}^{N} a_d(k) \qquad \text{Eq. 16}$$

The interference estimate $\hat{I}$ for the DPCH can be identified as the variance of the samples, which is given by:

$$\hat{I}_{DPCH} = \frac{1}{N}\sum_{k=1}^{N}|a_d(k) - m_d|^2 \qquad \text{Eq. 17}$$

The accuracy of the estimated variance will naturally improve as the number of samples increases, provided the characteristics of the communication channel remain suitably stable during the sample-collection period.

It will be appreciated that the DPCH comprises mainly two types of information: information data, i.e., the Dedicated Physical Data Channel (DPDCH); and Layer-1 control data, i.e., the Dedicated Physical Control Channel (DPCCH), that are time-multiplexed together in slots on the WCDMA downlink. The DPCCH comprises pilot symbols, power control information, and slot format information, and is always transmitted in all slots. The DPDCH is transmitted only when there is information data to be transmitted, and hence sometimes there is nothing transmitted on the DPDCH. This is called discontinuous transmission (DTX). The slot format information on the DPCCH indicates whether there are any data or not on the DPDCH, but that information is detected after the rake combiner and SIR estimator and so that information is not known when I-estimation is done. Hence, if DTX is possible on a DPDCH or similar channel, the DPDCH generally cannot be used reliably for I-estimation. Nevertheless, the DPCCH and similar channels that are always transmitted can always be used for I-estimation according to Eqs. 15-17 because the I-estimate is taken as the variance of the amplitude of received symbols on a DPCH (either a DPCCH alone—possible for DTX and not DTX—or both a DPCCH and DPDCH—possible only for not DTX). Thus, it is not necessary for the receiver to know what was transmitted, but rather it is enough for the receiver to know just that something was transmitted.

Figure 4:
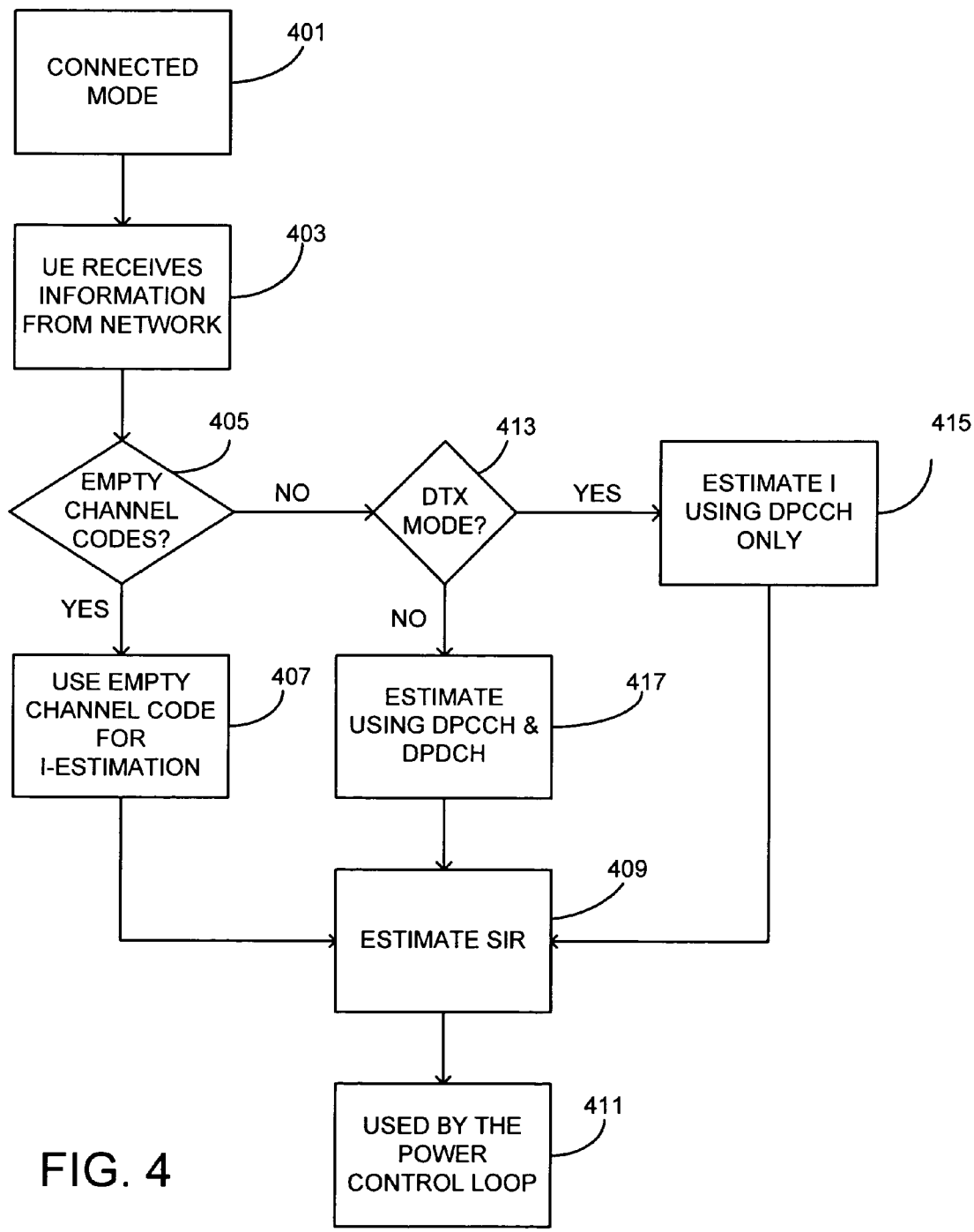
FIG. 4 is a flowchart of a method of estimating interference.

FIG. 4 is a flowchart of a method of estimating interference in accordance with this invention. In a WCDMA system, the terminal, or user equipment (UE), is initially (step 401) in connected mode, and the UE receives instructions and information to use an alternative or secondary scrambling code on the DPCH from the network (step 403). It will be appreciated that the alternative scrambling code and the DPCH channelization codes under the alternative scrambling code to be used by the UE are defined in the WCDMA standard as a function of the primary scrambling code and the original channelization code.

Figure 5:
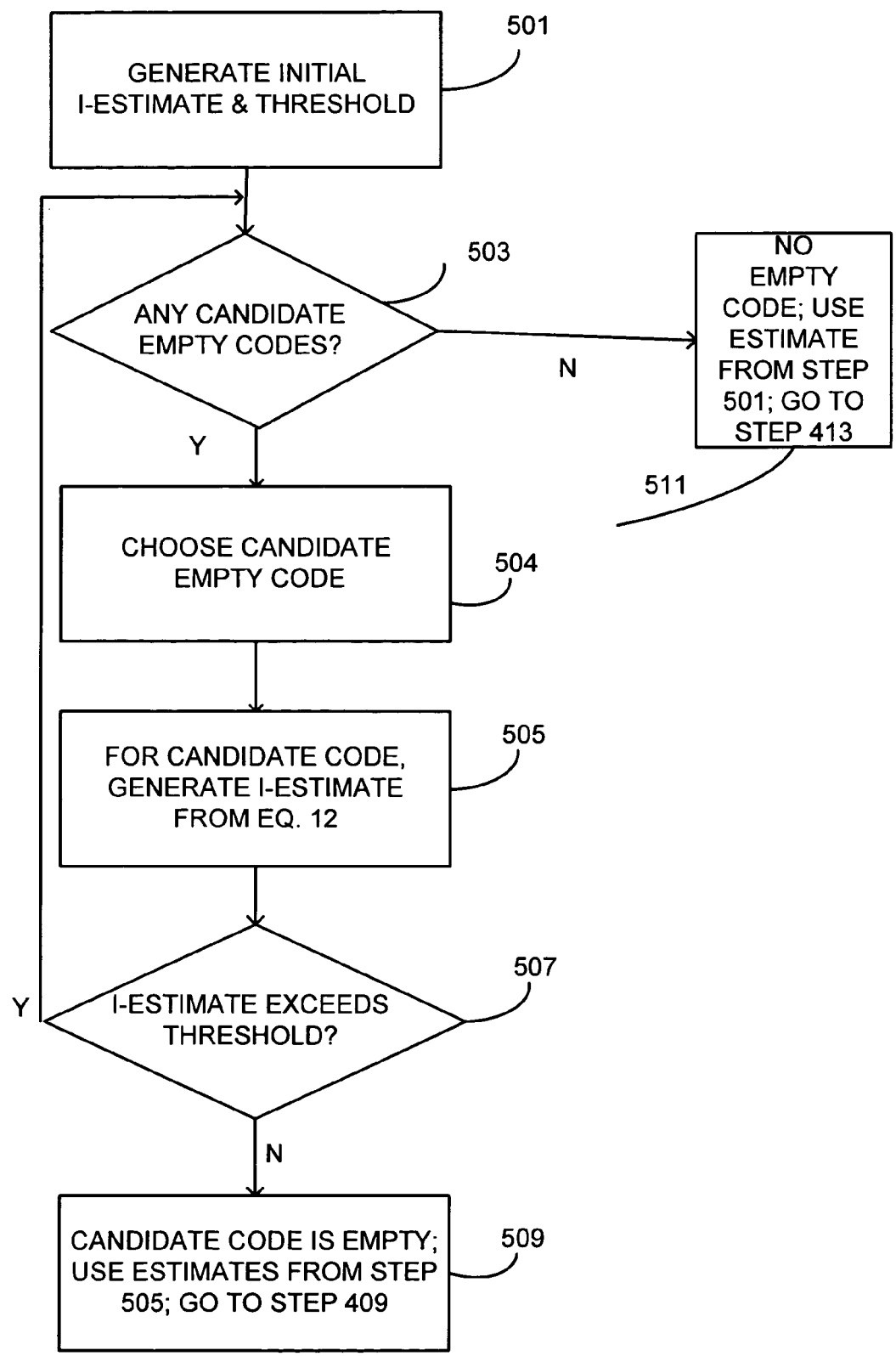
FIG. 5 is a flowchart of a method of searching for an empty channelization code.

At this point, the UE determines (step 405) whether it knows of an empty channelization code under the alternative scrambling code, either because it has been informed of such an empty code or because it has identified such an empty code as described below in connection with FIG. 5. If the receiver knows of an empty channelization code under the alternative scrambling code, the UE uses (step 407) such empty channelization code for estimating the interference according to Eq. 12, and the I-estimates are passed to other components in the UE that estimate the SIR (step 409) and provide the SIR estimates to still other components, such as the transmit power control loop (step 411). These receiver components are discussed in more detail below in connection with FIG. 6.

In some cases when alternative scrambling codes are used, the 3GPP standard gives information that can be used by the receiver to identify empty channelization codes. One such case involves compressed mode, when a base station may use an alternative scrambling code for compressed frames. 3GPP TS 25.213, sections 5.2.1-5.2.2, specify the alternative scrambling code as well as channelization codes to use in this case. These specifications also apply to the common control channels and their channelization codes, but since these channels are not in compressed mode, their corresponding compressed-mode channelization codes under the alternative scrambling code are not used, i.e., they are empty. Thus, these empty codes can be used for estimating the DPCH interference as described above. The terminal can easily decide whether there are any codes under the alternative scrambling code corresponding to the common channels in the primary scrambling code and identify these empty codes from its knowledge of the channelization codes of the common channel and the code allocation rules defined in the applicable standard.

If in step 405, the UE decides that it does not know of an empty channelization code under the alternative scrambling code, the UE can then determine (step 413) whether the system is using DTX, and if DTX mode is enabled, the UE estimates the interference (step 415) by determining the variance of symbols in the DPCCH portions of the DPCH according to Eqs. 15-17. The I-estimates are passed to the components in the UE that estimate the SIR (step 409) and provide the SIR estimates to other components, such as the transmit power control loop (step 411).

If in step 413, the UE determines that the system is not in DTX mode, the UE estimates the interference (step 417) by determining the variance of symbols either in both the DPCCH portion and the DPDCH portion of the DPCH or in only the DPCCH portion of the DPCH according to Eqs. 15-17. In fact, as noted above the DPCH and similar channels having at least one portion that always contains transmitted symbols can always be used for I-estimation according to Eqs. 15-17, and thus the determination of whether the system is in DTX mode (step 413) is not always necessary and can be omitted. In either case, the I-estimates are passed to the components in the UE that estimate the SIR (step 409) and provide the SIR estimates to other components, such as the transmit power control loop (step 411).

As described above, the terminal may have identified empty channelization codes that can be used for I-estimation, and if so, the terminal preferentially uses those empty codes for I-estimation. The receiver may have identified the empty codes from its knowledge of specified characteristics of the system, or of course, it may simply been informed by the system of empty channelization codes by suitable signaling messages from the transmitter. If the terminal has not identified any empty codes, the terminal estimates the interference from the variance of symbols on a dedicated channel such as the DPCH.

If no empty codes are identified and I-estimates better than the ones obtained using the DPCH are needed, the terminal can search for an empty channelization code. If at least one empty code is found, the terminal uses that code for obtaining I-estimates. A method of searching for empty channelization codes is described below and depicted in FIG. 5.

In step 501, an initial I-estimate is formed using the method of steps 413, 415, 417 described above. From the initial I-estimate, a threshold is derived and used in the further processing steps described below. It will be appreciated that the threshold may be the initial I-estimate or be derived from the initial I-estimate by filtering, or smoothing, e.g., by suitable time-averaging, successive initial I-estimates. The threshold also may be derived by scaling the initial I-estimate, by adding a positive or negative constant to the initial I-estimate, or by another way. The initial I-estimate, i.e., $\hat{I}_1$ from which the threshold is derived, is obtained from Eqs. 15-17 and is ideally equal to $I_1$ of Eq. 14, but due to inescapable estimation errors, the initial I-estimate can be expressed as $\hat{I}_1 = I_1 + e_1$ where $e_1$ is the estimation error.

In step 503, it is determined whether there are any candidate empty codes, and in step 504, a candidate code is chosen. In step 505, Eq. 12 is used to estimate the interference for the chosen candidate empty code. If the chosen candidate code is empty, Eq. 12 gives an estimate of the actual interference, i.e., $I_{m,\,empty} = I_1 + e_2$ where $e_2$ is the estimation error. If the chosen candidate code is not empty, Eq. 12 gives an estimate of the received power, i.e., $I_{m,\,not\,empty} = |h|^2(E_c^i) + I_1 + e_3$, where $e_3$ is the estimation error. Ideally, $I_{m,\,empty} = \hat{I}_1$ and $I_{m,\,not\,empty} > \hat{I}_1$ but due to the estimation errors, the re is a non-zero probability of missed detection (i.e., an actually empty code is not detected). Thus, it can be beneficial to filter $\hat{I}_1$ and/or $I_m$ to reduce the estimation errors. The threshold can be chosen based on the filter parameters, risk of missed detection, etc. The chosen threshold can be computed off-line (e.g., defined in a laboratory) and stored in the UE.

Figures 2, 3:
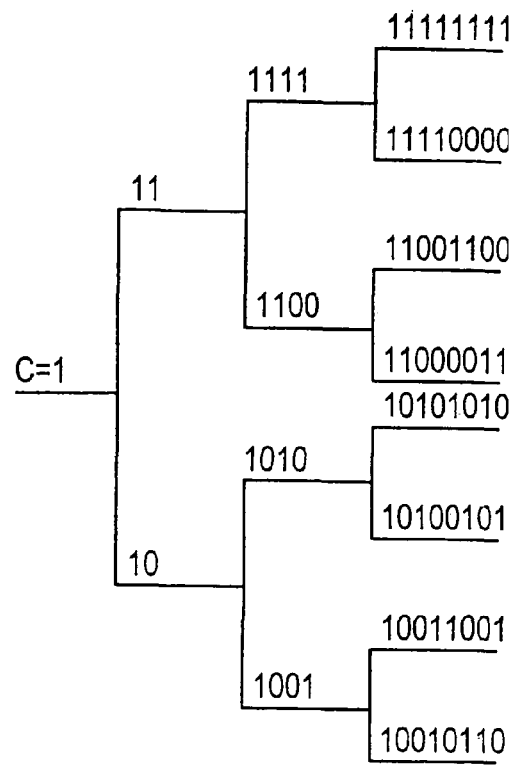
FIG. 2 depicts an OVSF code tree.
FIG. 3 depicts three different channelization codes from an OVSF tree used to spread three information streams.

In choosing a candidate empty code in step 504, it is advantageous for all codes of a selected SF length (typically, either 128 or 256) to be searched in a systematic way. In order to determine a search order, the terminal advantageously considers the rules about code allocation specified in the applicable standard. In a typical WCDMA system, a base station allocates codes starting from one side of the code tree that is known. Therefore, as a starting point, the terminal determines which channelization code the DPCH is using, locates the used code in a code tree, and then chooses a candidate empty code as far away in the code tree as possible from that DPCH channelization code. FIG. 2 shows well what "far away in the code tree" means. In a WCDMA system, the CPICH always uses the code 11111111 ... 11111 (i.e., 256 "ones") and the broadcast channel uses the code 11 ... 1-1-1 ... -1-1 (i.e., 128 "ones" followed by 128 "−ones"). This corresponds to the upper code tree in FIG. 2. Since code allocation is often done by filling branches before using a new branch, the first user (DPCH) has code(s) close to the CPICH and broadcast codes. Hence, "far away" typically means at the lower end of a code tree like that depicted in FIG. 2. In the SF=8 case, one would start with 10010110, then 10011001 and so on. This can result in a large likelihood of finding empty codes, and if a candidate empty code is chosen (step 504), the process moves to step 505.

In step 505, the interference is estimated for the chosen candidate empty code as described above, and in step 507, the I-estimate is compared to the threshold, i.e., a value that is based on the rough I-estimate obtained in step 501. If the I-estimate is much larger than the threshold, then it is likely that this corresponds to signal power and therefore the code is in use, in which case the search continues with next code and repeats steps 503-507.

If, however, the I-estimate for a code, say code $c_s$, is below the threshold, then the code is probably empty and the search can be stopped, with processing moving to step 509. In step 509, de-spreading is performed with respect to $c_s$ and the estimate derived in step 505 is used, with the process moving to step 409.

If there are no candidate empty codes (step 503) so that no empty code is chosen in step 504, one has to rely on the initial I-estimate from step 501, i.e., using the method of steps 413, 415, 417 described above (step 511).

Since the number of codes used in a cell varies with time, the terminal continually has to detect whether the code used for I estimation has been occupied by another user or not. If so, the search for a new empty channelization code starts again, according to the description above.

Figure 6:
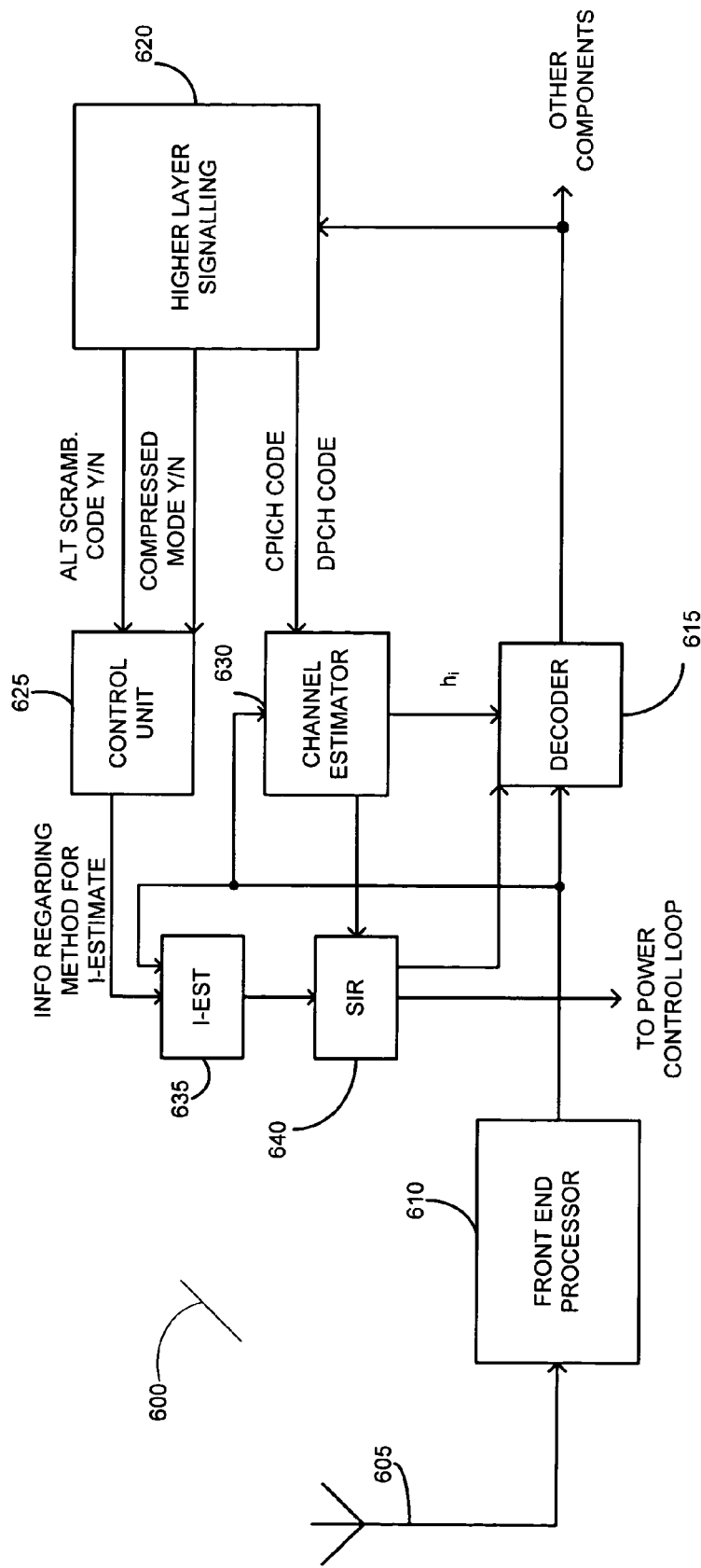
FIG. 6 is an exemplary block diagram of a mobile station.

FIG. 6 is a block diagram of an exemplary receiver 600 such as a mobile station that implements these methods. One skilled in the art will appreciate that a mobile station, such as a mobile telephone, would typically include additional circuitry (not shown) that aids in the sending, receiving, and processing signals and data.

The receiver 600 includes an antenna 605 for receiving a transmitted signal, such as a radio signal. The antenna provides the received signal to a front-end processor 610 that transforms, e.g., down-converts, de-spreads, and rakes, the received signal to a base-band signal that is provided to a decoder 615 and estimators 630, 635. The decoded signal produced by the decoder 615 is provided to a processor 620 that determines higher-layer signaling messages carried by the decoded signal and to other components (not shown) of the receiver 600. Among these signaling messages are indications of whether the communication system is using alternative scrambling codes and compressed mode and messages that enable the receiver to identify the CPICH code and the DPCH code. As shown in FIG. 6, this information is passed to a control unit 625 and a channel estimator 630. The channel estimator 630 continually estimates the impulse response ĥ of the communication channel based on data in the received signal and provides these estimates to the decoder 615 for improving the performance of the decoding process, as is typical in the art.

As described above, the control unit 625 determines which method of I-estimation to use based on the information provided to it by the processor 620. This selection is passed to an I-estimator 635 that implements the selected method, thereby generating an I-estimate value that is passed to a SIR estimator 640. SIR estimates generated by the estimator 640 are passed to the decoder 615 for improving the performance of the decoding process and to components providing transmit power control (not shown), as is typical in the art.

It will be appreciated that the procedures described above are carried out repetitively as necessary to respond to the time-varying characteristics of the channel between the transmitter and receiver. To facilitate understanding, many aspects of the invention are described in terms of sequences of actions to be performed by, for example, elements of a programmable computer system. It will be recognized that the various actions could be performed by specialized circuits (e.g., discrete logic gates interconnected to perform a specialized function or application-specific integrated circuits), by program instructions executed by one or more processors, or by a combination of both.

Moreover, the invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain or store the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), and a portable compact disc read only memory (CD-ROM).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of estimating interference in a user equipment in a code division multiple access communication system, in which a pilot channel uses a scrambling code and the user equipment uses an alternative scrambling code on a dedicated channel determined by a channelization code, comprising the steps of:

the user equipment determining whether the user equipment knows of an empty channelization code m under the alternative scrambling code;

if the empty channelization code m is known to the user equipment, then the user equipment using the empty channelization code m for estimating the interference; and if the empty channelization code m is not known to the user equipment, then the user equipment estimating the interference by determining a variance of symbols in at least two portions of the dedicated channel, wherein the variance represents an average squared difference between complex amplitudes of despread received symbols in the at least two portions of the dedicated channel and a mean of complex amplitudes of despread received symbols in the at least two portions of the dedicated channel.

2. The method of claim 1, wherein determining the variance of symbols in at least two portions of the dedicated channel is performed only after first determining that the communication system is not using discontinuous transmission (DTX).

3. The method of claim 1, wherein the at least two portions include a dedicated physical control channel (DPCCH) and a dedicated physical data channel (DPDCH).

4. The method of claim 1, wherein the dedicated channel is a dedicated physical channel (DPCH) and the pilot channel is a common pilot channel (CPICH).

5. The method of claim 1, wherein the empty channelization code m is determined by the user equipment based on either information of such an empty code or identification of the empty code.

6. The method of claim 5, wherein the information of the empty channelization code m is included in a message sent to the user equipment.

7. The method of claim 5, wherein the information of an empty channelization code m is included in a specification of the communication system.

8. The method of claim 7, wherein the information of an empty channelization code includes channelization codes used by a common control channel.

9. The method of claim 5, wherein identification of the empty channelization code m comprises the steps of:
generating an initial interference estimate (I-estimate);
setting a threshold based on the initial I-estimate;
selecting a candidate empty channelization code;
for the candidate empty channelization code, forming an I-estimate;
comparing the formed I-estimate to the threshold; and
if the formed I-estimate exceeds the threshold, selecting another candidate empty code and repeating the forming and comparing steps, otherwise identifying the candidate empty code as the empty channelization code.

10. The method of claim 9, wherein the initial I-estimate is based on a variance of symbols in a signal received by the user equipment.

11. The method of claim 9, wherein the threshold is set as the initial I-estimate.

12. The method of claim 9, wherein the I-estimate is formed according to $$I_m = \frac{1}{N}\sum_{k=1}^{N}|d_k^m|^2.$$

wherein:
$I_m$ is an estimate of interference power on a code m;
N is a number of symbols used in forming the I-estimate;
$d_k^m$ represents a k-th symbol despread with respect to applicable scrambling and channelization codes.

13. The method of claim 1, wherein the interference for the empty channelization code m is estimated according to $$I_m = \frac{1}{N}\sum_{k=1}^{N}|d_k^m|^2.$$

wherein:
$I_m$ is an estimate of interference power on a code m;
N is a number of symbols used in forming the I-estimate;
$d_k^m$ represents a k-th symbol despread with respect to applicable scrambling and channelization codes.

14. The method of claim 1, wherein if the empty channelization code m is not known to the user equipment, then the interference is estimated by determining the variance of symbols according to $$\hat{I}_{DPCH} = \frac{1}{N}\sum_{k=1}^{N}|a_d(k) - m_d|^2.$$

wherein:
$\hat{I}_{DPCH}$ is an interference estimate for the dedicated physical channel (DPCH);
$a_d(k)$ is a complex amplitude of a k-th sample of the despread received signal $d_k$;
N is a number of complex amplitudes; and
$m_d$ is the mean of a number N of the complex amplitudes.

15. The method of claim 1, wherein a portion is a dedicated physical control channel (DPCCH).

16. The method of claim 1, wherein the estimated interference is used for estimating a signal-to-interference ratio.

17. A method of searching for an empty channelization code m in a user equipment in a code division multiple access communication system, comprising the steps of: the user equipment generating an initial interference estimate (I-estimate);the user equipment setting a threshold based on the initial I-estimate; the user equipment selecting a candidate empty channelization code m; for the candidate empty channelization code m, the user equipment forming an I-estimate; the user equipment comparing the formed I-estimate to the threshold; and if the formed I-estimate exceeds the threshold, the user equipment selecting another candidate empty channelization code and repeating the forming and comparing steps, otherwise the user equipment identifying the candidate empty channelization code m as an empty channelization code;
wherein the formed I-estimate for the candidate empty channelization code m represents an average squared magnitude value computed from N symbols despread with respect to an applicable scrambling code and the candidate empty channelization code.

18. The method of claim 17, wherein the initial I-estimate is based on a variance of symbols in a signal received by the user equipment.

19. The method of claim 17, wherein the threshold is set as the initial I-estimate.

20. The method of claim 17, wherein the I-estimate is formed according to $$I_m = \frac{1}{N}\sum_{k=1}^{N}|d_k^m|^2.$$

wherein:
$I_m$ is an estimate of interference power on a code m;
N is a number of symbols used in forming the I-estimate;
$d_k^m$ represents a k-th symbol despread with respect to applicable scrambling and channelization codes.

21. The method of claim 17, further comprising the step of estimating interference based on the empty channelization code.

22. The method of claim 17, wherein a threshold is derived from the initial I-estimate by filtering the initial I-estimate.

23. The method of claim 17, wherein the candidate empty channelization code m is selected based on predetermined code allocation rules.

24. The method of claim 17, wherein the candidate empty channelization code m is selected by determining a channelization code used by a channel, locating the used channelization code in a code tree, and choosing as the candidate empty channelization code m a code in the code tree that is remote from the used channelization code.

25. An apparatus for estimating interference in a user equipment in a code division multiple access communication system, in which a pilot channel uses a scrambling code and the user equipment uses an alternative scrambling code on a dedicated channel determined by a channelization code, comprising: controller circuitry that determines whether the user equipment knows of an empty channelization code m under the alternative scrambling code; and an interference estimator, wherein if the controller circuitry determines that the empty channelization code m is known to the user equipment, then the interference estimator generates an estimate of the interference based on the empty channelization code m; and if the controller circuitry determines that the empty channelization code m is not known to the user equipment, then the interference estimator generates the estimate of the interference based on a variance of symbols in at least two portions of the dedicated channel,
wherein the variance represents an average squared difference between complex amplitudes of despread received symbols in the at least two portions of the dedicated channel and a mean of complex amplitudes of despread received symbols in the at least two portions of the dedicated channel.

26. The apparatus of claim 25, wherein the controller circuitry determines the variance of symbols in the at least two portions of the dedicated channel only after first determining that the communication system is not using discontinuous transmission (DTX).

27. The apparatus of claim 25, wherein the controller circuitry determines the empty channelization code m based on either information of such an empty code or identification of the empty code, and the controller circuitry identifies the empty channelization code m by:
generating an initial interference estimate (I-estimate);
setting a threshold based on the initial I-estimate;
selecting a candidate empty channelization code;
for the candidate empty channelization code, forming an I-estimate;
comparing the formed I-estimate to the threshold; and
if the formed I-estimate exceeds the threshold, selecting another candidate empty code and repeating the forming and comparing steps, otherwise identifying the candidate empty code as the empty channelization code.

28. The apparatus of claim 27, wherein the threshold is derived from the initial I-estimate by filtering the initial I-estimate.

29. The apparatus of claim 25, wherein the user equipment complies with a standard for a universal mobile telecommunications system.

30. A non-transitory computer-readable medium containing a computer program for estimating interference in a user equipment in a code division multiple access communication system, in which a pilot channel uses a scrambling code and the user equipment uses an alternative scrambling code on a dedicated channel determined by a channelization code, wherein the computer program performs the steps of: determining whether the user equipment knows of an empty channelization code m under the alternative scrambling code; if the empty channelization code m is known to the user equipment, then using the empty channelization code m for estimating the interference; and if the empty channelization code m is not known to the user equipment, then estimating the interference by determining a variance of symbols in at least two portions of the dedicated channel,
wherein the variance represents an average squared difference between complex amplitudes of despread received symbols in the at least two portions of the dedicated channel and a mean of complex amplitudes of despread received symbols in the at least two portions of the dedicated channel.

31. The non-transitory computer-readable medium of claim 30, wherein the computer program determines the variance of symbols in at least two portions of the dedicated channel only after first determining that the communication system is not using discontinuous transmission (DTX).

32. The non-transitory computer-readable medium of claim 30, wherein the computer program determines the empty channelization code m based on either information of such an empty code or identification of the empty code, and the computer program identifies the empty channelization code m by performing the steps of:
generating an initial interference estimate (I-estimate);
setting a threshold based on the initial I-estimate;
selecting a candidate empty channelization code;
for the candidate empty channelization code, forming an I-estimate;
comparing the formed I-estimate to the threshold; and
if the formed I-estimate exceeds the threshold, selecting another candidate empty code and repeating the forming and comparing steps, otherwise identifying the candidate empty code as the empty channelization code.

33. The apparatus of claim 27, wherein the controller circuitry forms the I-estimate according to $$I_m = \frac{1}{N}\sum_{k=1}^{N} |d_k^m|^2,$$

wherein:
$I_m$ is an estimate of interference power on a code m;
N is a number of symbols used in forming the I-estimate;
$d_k^m$ represents a k-th symbol despread with respect to applicable scrambling and channelization codes.

34. The apparatus of claim 25, wherein the interference estimator estimates the interference for the empty channelization code m according to $$I_m = \frac{1}{N}\sum_{k=1}^{N} |d_k^m|^2,$$

wherein:
$I_m$ is an estimate of interference power on a code m;
N is a number of symbols used in forming the I-estimate;
$d_k^m$ represents a k-th symbol despread with respect to applicable scrambling and channelization codes.

35. The apparatus of claim 25, wherein if an empty channelization code is not determined, the interference estimator estimates the interference by determining the variance of symbols according to $$\hat{I}_{DPCH} = \frac{1}{N}\sum_{k=1}^{N} |a_d(k) - m_d|^2,$$

wherein:
$\hat{I}_{DPCH}$ is an interference estimate for the dedicated physical channel (DPCH);
$a_d(k)$ is a complex amplitude of a k-th sample of a the despread received signal $d_k$;
N is a number of complex amplitudes; and
$m_d$ is the mean of a number N of the complex amplitudes.

36. An apparatus for searching for an empty channelization code m in a user equipment in a code division multiple access communication system, comprising:
controller circuitry that identifies the empty channelization code m by:
generating an initial interference estimate (I-estimate);
setting a threshold based on the initial I-estimate;
selecting a candidate empty channelization code m;
for the candidate empty channelization code m, forming an I-estimate;
comparing the formed I-estimate to the threshold; and
if the formed I-estimate exceeds the threshold, selecting another candidate empty channelization code and repeating the forming and comparing steps, otherwise identifying the candidate empty channelization code m as an empty channelization code,
wherein the I-estimate is formed according to $$I_m = \frac{1}{N}\sum_{k=1}^{N} |d_k^m|^2,$$

wherein:
$I_m$ is an estimate of interference power on a code m;
N is a number of symbols used in forming the I-estimate;
$d_k^m$ represents a k-th symbol despread with respect to applicable scrambling and channelization codes.

* * * * *

UNITED STATES PATENT AND TRADEMARK OFFICE
CERTIFICATE OF CORRECTION

| | | |
|---|---|---|
| PATENT NO. | : 7,822,155 B2 | Page 1 of 1 |
| APPLICATION NO. | : 10/700855 | |
| DATED | : October 26, 2010 | |
| INVENTOR(S) | : Lindoff et al. | |

It is certified that error appears in the above-identified patent and that said Letters Patent is hereby corrected as shown below:

In the drawings:
Fig. 6, Sheet 5 of 5, delete "$h_i$" and insert -- $\hat{h}_i$ --, therefor.

In Column 3, Line 47, delete "$u_{kk}^{x}$" and insert -- $u_k^x$ --, therefor.

In Column 11, Line 52, delete "$\hat{h}$" and insert -- $\hat{h}_i$ --, therefor.

In Column 13, Line 50, in Claim 12, after the equation, delete "." and insert -- , --, therefor.

In Column 13, Line 64, in Claim 13, after the equation, delete "." and insert -- , --, therefor.

In Column 14, Line 13, in Claim 14, after the equation, delete "." and insert -- , --, therefor.

In Column 14, Line 59, in Claim 20, after the equation, delete "." and insert -- , --, therefor.

In Column 17, Lines 14-15, in Claim 35, delete "a the despread" and insert -- the despread --, therefor.

Signed and Sealed this
Seventeenth Day of May, 2011

David J. Kappos
*Director of the United States Patent and Trademark Office*